ELECTRICAL CONNECTION ELEMENTS AND CONNECTORS
Filed Oct. 1, 1963 6 Sheets-Sheet 1
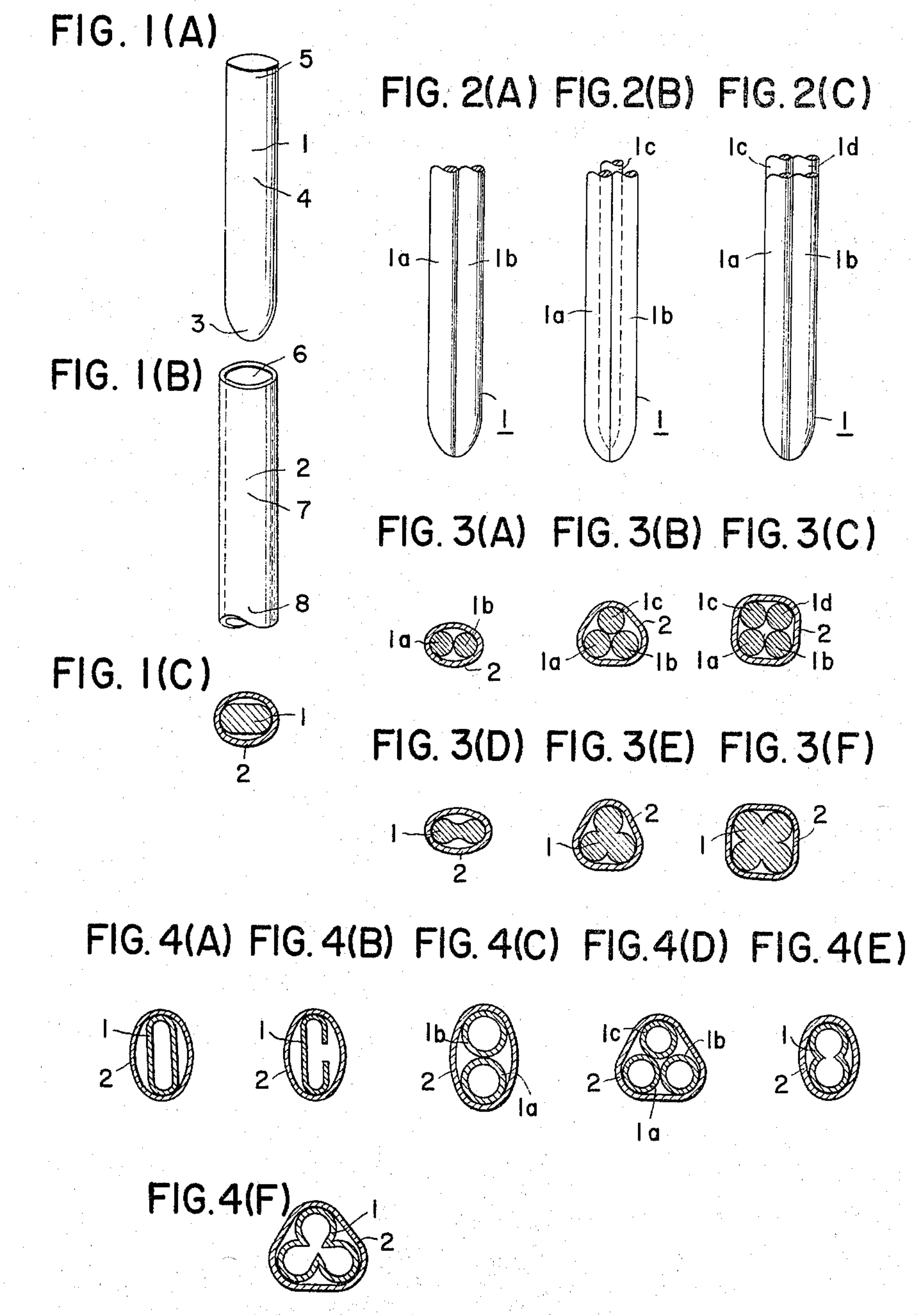
FIG. 1(A), FIG. 1(B), FIG. 1(C), FIG. 2(A), FIG. 2(B), FIG. 2(C), FIG. 3(A), FIG. 3(B), FIG. 3(C), FIG. 3(D), FIG. 3(E), FIG. 3(F), FIG. 4(A), FIG. 4(B), FIG. 4(C), FIG. 4(D), FIG. 4(E), FIG. 4(F)
INVENTORS
Shintaro Oshima, et al
BY Robert E. Burns
Attorney

ELECTRICAL CONNECTION ELEMENTS AND CONNECTORS

Filed Oct. 1, 1963 6 Sheets-Sheet 2

INVENTORS
Shintaro Oshima, et al
BY Robert E. Burns
Attorney

ELECTRICAL CONNECTION ELEMENTS AND CONNECTORS

Filed Oct. 1, 1963 6 Sheets-Sheet 3

INVENTORS

Shintaro Oshima et al

BY Robert E. Burns

Attorney

ELECTRICAL CONNECTION ELEMENTS AND CONNECTORS

Filed Oct. 1, 1963 6 Sheets-Sheet 4

INVENTORS
Shintaro Oshima et al
BY Robert E. Burns
Attorney

ELECTRICAL CONNECTION ELEMENTS AND CONNECTORS

Filed Oct. 1, 1963 6 Sheets-Sheet 5

INVENTORS
Shintaro Oshima et al
BY Robert C. Burns
Attorney

ELECTRICAL CONNECTION ELEMENTS AND CONNECTORS

Filed Oct. 1, 1963 6 Sheets-Sheet 6

INVENTORS
Shintaro Oshima et al
BY
Robert E. Burns
Attorney 3,281,760

ELECTRICAL CONNECTION ELEMENTS AND CONNECTORS

Shintaro Oshima, Kichijoji, Higashi-machi, Musashino-shi, and Yukio Nakagome, Nerima-ku, Tokyo-to, Japan, assignors to Kokusai Denshin Denwa Kabushiki Kaisha, Tokyo-to, Japan, a joint-stock company of Japan Filed Oct. 1, 1963, Ser. No. 313,031
Claims priority, application Japan, Oct. 11, 1962, 37/45,081
6 Claims. (Cl. 339—176)

Figure 5A:
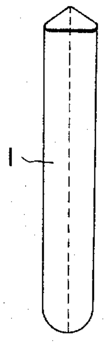
Figure 5B:
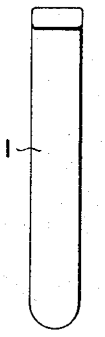
Figure 5C:
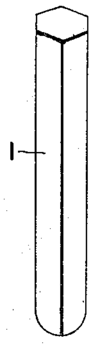

The present invention relates to electrical connection elements and electrical connectors including said elements, and more particularly it relates to an electronic connection element provided with a jack member composed of a tubular or "pipe-shaped" linear electric conductor the section of which forms a closed loop.

In general, in the conventional electronic connectors, a kerf is provided on either one of the plug member and jack member and the contact pressure between the said members is established by an elastic force occurring at the base portion of the said kerf when said members are coupled with each other. As a result, the contact portion between the plug and jack members is based to only one portion along the length of the said members because of deformation of the said kerf. This non-uniformity of the contact distribution occurs in the electronic connectors of another conventional type. Furthermore, in the conventional electrical connector provided with plug and jack members, elastic fatigue would occur after repetition of coupling and decoupling of the plug and jack members, whereby the contact resistance of the said connectors is made to increase or to become unstable, and since the electronic connection element itself has a resiliency and the reliability of the contact and the life thereof depend very greatly upon the machining precision, an extremely high precision is required for constructing and fixing each of the component members, thus causing the constructed electronic connector to be extremely expensive.

Accordingly, it is an object of the present invention to provide electronic connection elements and or electronic connectors including the said electric connection element, which have none of such disadvantages as described above, can maintain their uniform, stable and more sure contact pressure between their cooperating plug and jack members over their entire contact lengths, and can be easily mass-produced because of their very simple constructions.

Said object and other objects and advantages of the present invention have been attained by an electrical connection element comprising a plug member composed of at least one linear electric conductor having one end rounded off or tapered off and the other end to be connected to outside connection wires and a jack member composed of a linear electric conductor having one opened end for accepting therein the said plug member led by the rounded off or tapered off end and the other end to be connected to outside connection wires, characterized in that the said jack member is composed of a tubular electric conductor the section of which forms a closed loop unsimilar to a section of the said plug member, and the inside diameter of the said closed loop is slightly smaller than the diameter of a circumscribed circle of the said plug member, whereby contact of the said plug member and jack member is maintained substantially by means of elasticity resulting from deformation of the said jack member in the case of coupling said both members and acting in the direction orthogonal to lengthwise direction of the said jack member.

Figure 8A:
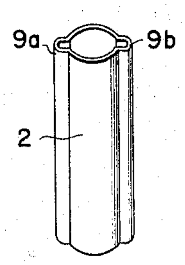
Figure 8B:
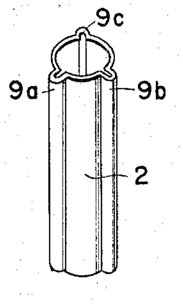
Figure 8C:
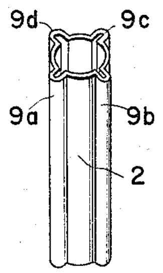
Figure 8D:
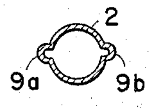
Figure 8E:
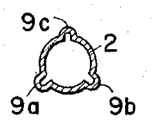
Figure 8F:
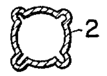
Figure 18A:
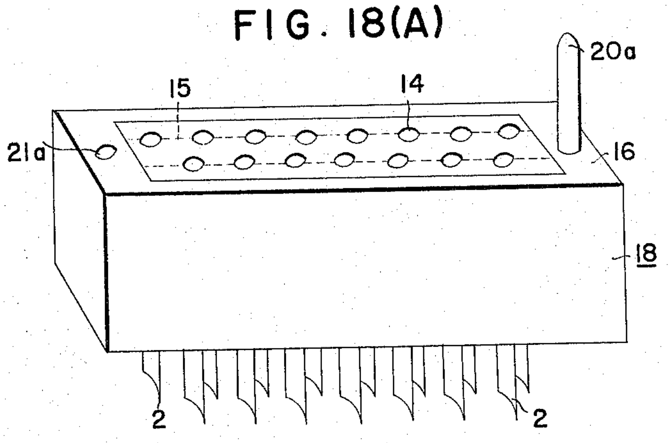
Figure 18B:
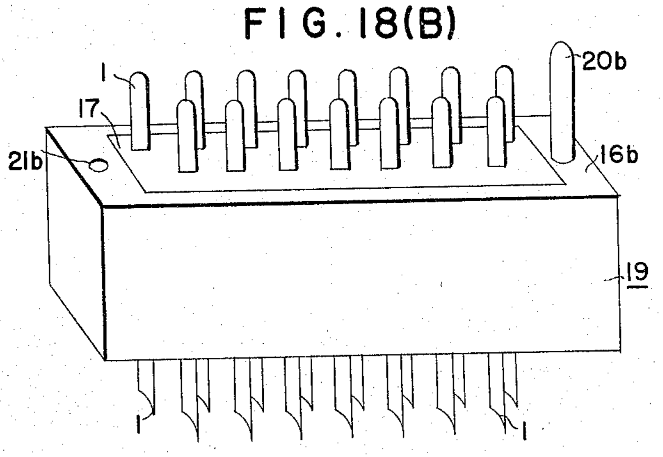
Figure 19A:
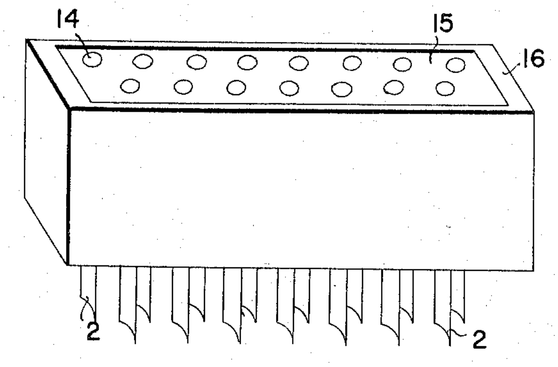
Figure 19B:
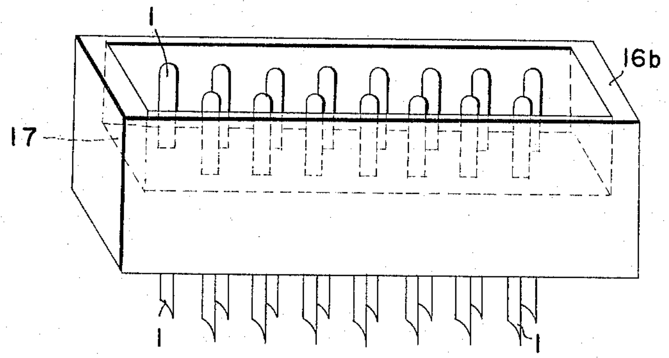

The novel features of this invention are set forth with particularity in the appended claims. This invention, however, both as to its construction and formation together with further objects and advantages thereof, may best be understood by reference to the following description, taken in connection with the accompanying drawings, in which the same or equivalent parts are designated by the same reference characters, and in which:

FIGS. 1(A), 1(B) and 1(C) are, respectively, perspective views and a sectional view showing the basic construction of an electrical connection element embodying the feature of this invention;

FIGS. 2(A)–(C), 5(A)–(C) and 7(A)–(C) are perspective views of various different plug members of an electrical connection element embodying the feature of this invention;

FIGS. 3(A)–(F), 4(A)–(F) and 6(A)–(F) are, respectively, sectional views of three different electrical connection elements embodying the feature of this invention;

FIGS. 8(A), 8(B), 8(C), and FIG. 9, respectively, are perspective views showing three different jack members of an electrical connection element embodying the feature of this invention;

FIGS. 8(D), 8(E) and 8(F), respectively, are seectonal views of the embodiments of FIGS. 8(A), 8(B) and 8(C);

FIGS. 10(A)–(D), 11(A)–(E) and 12 are, respectively, perspective view illustrating different stop means of an electrical connection element embodying the feature of this invention;

FIGS. 13, 14, 15, 16, 17(A) and 17(B) are, respectively, sectional views illustrating different stationary supporting means of an electrical connection element embodying the feature of this invention;

FIGS. 18(A) and 18(B) are perspective views showing an electrical connector embodying the feature of this invention; and FIGS. 19(A) and 19(B) are perspective views of another electrical connector embodying the feature of this invention.

As illustrated roughly in FIG. 1, the invention is shown as embodied in an electrical connection element consisting of a plug member 1 and a jack member 2. The plug member 1 is composed of an electric conductor consisting of a central linear portion 4 having one end portion 3 rounded off or tapered off and the other end portion 5 to be connected to outside connection wire. The jack member 2 is a tubular electrical conductor having one open end 6 for accepting therein (led by the rounded off or tapered off end) the plug member 1 and the other end 8 to be connected to outside connection wire. The section of the jack member 2 forms a closed loop whose inside diameter is made slightly smaller than the diameter of the circumscribed circle of the plug member 1, and the section of the jack member 2 is formed to be dissimilar, in shape, to the section of the plug member 1.

In the embodiment of FIG. 1 the section of the plug member 1 has an elliptical or roughly elliptical form, whereas the section of the jack member 2 is a circle. According to this embodiment, in the case of coupling said both members 1 and 2, deformation of the jack member 2 takes place due to the fact that the inside diameter of the jack member 2 is smaller than the outside diameter (or more precisely the diameter of a circumscribed circle) of the plug member 1 and thus stress occurs in the direction orthogonal to lengthwise direction of the jack member. Due to said stress, contact of the plug member 1 and the jack member 2 is maintained quite satisfactorily. Moreover, contrary to conventional electrical connection elements, the contact pressure is distributed almost evenly over the entire contact lengths and type of said contact is close to a linear contact.

In the embodiment of FIG. 1, the plug member 1 is of a rod shape, but it can be of a tubular shape as described hereinafter. Preferred materials for the plug member 1 are general electrical conductors such as copper or brass etc., while elastic materials such as Phosphor bronze or beryllium copper etc. are suitable for the jack member 2. If necessary, said both members 1 and 2 can be plated with silver or gold etc., whereby a better result will be obtained. When such plating method is used, it becomes possible to utilize poor conductors.

FIG. 2 shows a plug member 1 composed of a plurality (1*a*, 1*b*; 1*a*, 1*b*, 1*c*; and 1*a*, 1*b*, 1*c*, 1*d*) of rod-shaped conductive wires which are arranged in parallel, each of said wires having a circular cross section, and the number of wires being two in the case of FIG. 2(A), three in the case of FIG. 2(B), and four in the case of FIG. 2(C). FIGS. 3(A), 3(B), and 3(C) are sectional views showing each of said wires coupled with the tubular jack member 2. FIGS. 3(D), 3(E), and 3(F) show, respectively, the cases wherein group wires (1*a*, 1*b*), (1*a*, 1*b*, 1*c*) and (1*a*, 1*b*, 1*c*, 1*d*), each forming each plug member, are respectively united with each other as one body so that the plug member has a cross-section having petal-shaped projections.

FIGS. 4(A)–4(F) show the embodiments in which a tubular conductive wire is used as the plug member 1 or as a component of the plug member 1. In FIGS. 4(E) and 4(F) the cross-section of the plug member 1 has petal-shaped projections. According to these embodiments, since the deformation due to coupling of the plug and jack members 1 and 2 occurs not only at the jack member 2, but also at the plug member, contact thus obtained is far better than the case wherein a rod is used as the plug member 1.

Figure 6A:
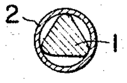
Figure 6B:
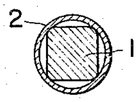
Figure 6C:
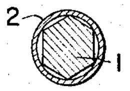
Figure 6D:
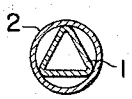
Figure 6E:
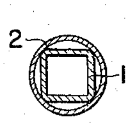
Figure 6F:
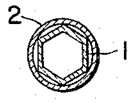

FIG. 5 shows the plug member 1 wherein rod-shaped conductors having a polygonal cross section are used, and FIGS. 6(A), 6(B) and 6(C) are sectional views which are taken in the states of being coupled with a jack member 2. In these embodiments, the contact between the jack and plug members is of substantially linear contact. Thus, it becomes possible to obtain a virtually large contact pressure by effective utilization of the stress resulting from the deformation of the jack member, thereby a stable, small contact resistance can be obtained. FIGS. 6(D), 6(E), and 6(F) show modifications of the jack member 1 in which the jack member 1 is composed of a tubular conductor having a polygonal cross section.

In the electrical connection element of this invention, since substantially linear contact is adapted as illustrated above, the stress caused by deformation of the jack member 2 which occurs in the case of coupling jack and plug members is mostly utilized. Therefore, when coupling and decoupling of the plug and jack members have been performed repeatedly, there will occur an elastic fatigue at the jack member 2, thereby the cross section of said jack member 1 may be caused to become like the external form of the plug member 1, thus causing possibility of decrease in contact pressure.

Figure 7A:
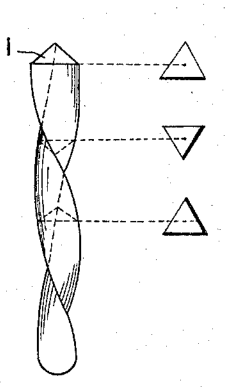
Figure 7B:
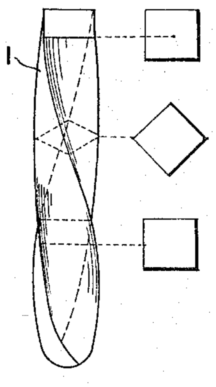
Figure 7C:
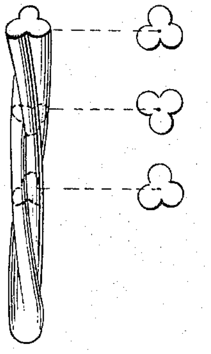

FIG. 7 shows an embodiment which is proposed to overcome said defect, wherein the plug member 1 is twisted about its axis. FIG. 7(A) shows one having triangular cross section, FIG. 7(B) shows one having rectangular cross section and FIG. 7(C) shows one with a cross-section having petal-shaped projections. In this case, the contact of both members 1 and 2 is in spiral form and the contact of the plug member 1 with the jack member 2 extends over the entire inside surface of the jack member 2 in the case of coupling both members, thereby enabling maintainance of a good contact at all times without being permanently deforming the jack member 2 due to elastic fatigue causing the contact pressure to be decreased.

FIG. 8 shows embodiments wherein the jack member 2 is composed of a tubular conductor having a round cross section with projections, and FIGS. 8(A), 8(B) and 8(C) are perspective views and FIGS. 8(D), 8(E), and 8(F) are sectional views. In these embodiments, plug member 1 with round cross section can be used. Needless to say, plug members to be used can be of some other type than those illustrated above. Since the jack member 2 is capable of bearing the majority of elasticity of the jack member 2 upon the projections (9*a*, 9*b*), (9*a*, 9*b*, 9*c*), and (9*a*, 9*b*, 9*c*, 9*d*), contact of the jack member 2 and plug member 1 is preserved without causing any contact deficiency due to survival of the deformation of the jack member 2.

Figure 9A:
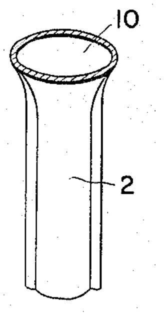
Figure 9B:
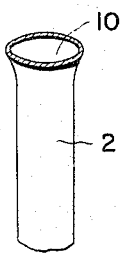

FIG. 9 shows two other embodiments of the jack member 2 whose opened end 10 being extended so as to facilitate the insertion of the plug member 1. In the case of composing en electrical connection element using said connection element, provision of the extended opened end 10 brings a advantage in that it becomes possible to give an allowance to mechanical accuracy thereof.

Next, a stop means or stopper 11 to be used in the electrical connector provided with a plurality of the electrical connection elements will be explained.

Figures 10A, 10B, 10C, 10D:
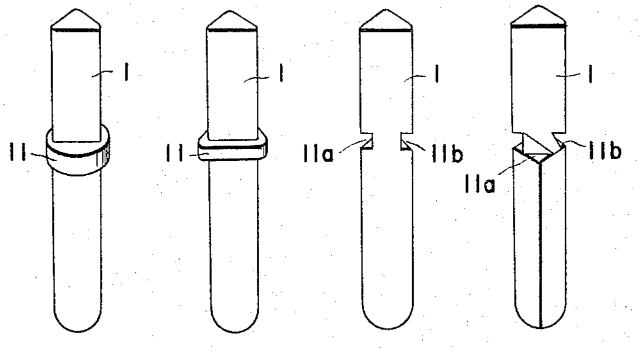

FIG. 10 shows embodiments wherein the stop means 11 is provided in the plug member 1. FIG. 10(A) shows stop means composed of a ring-shaped flange, FIG. 10(B) shows stop means composed of a ring-shaped triangular flange, FIG. 10(C) shows a notch-type stopper provided with notches 11*a* and 11*b*, and FIG. 10(D) shows a stopper consisting of notches 11*a* and 11*b* screwed on the same axis. In each of the above cases, it is possible to fix the plug member 1 securely along the lengthwise direction thereof by holding said stop means 11 with an insulating material. Naturally, in the cases of FIGS. 10(A) and 10(B), an insulating support means having a concave portion is to be used, while in the cases of FIGS. 10(C) and 10(D), an insulating support means having a convex portion is to be used for supporting. In the case shown in FIG. 10(D), the use of a supporter which is divided into two parts in its lengthwise direction is advantageous.

Figure 12:
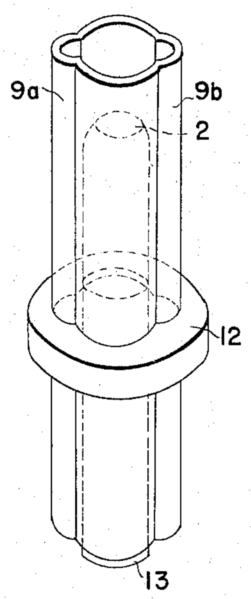
Figure 11A:
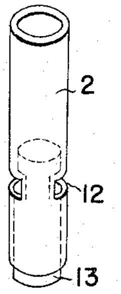
Figure 11B:
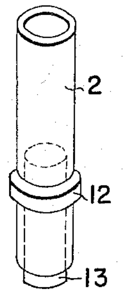
Figure 11C:
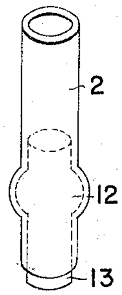
Figure 11D:
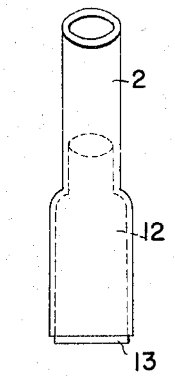
Figure 11E:
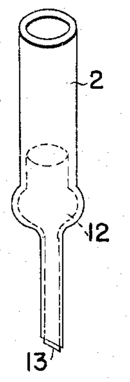

FIG. 11 shows various kinds of the jack member 2 provided with a stop means 12, the purpose of which is the same as that of the plug member 1. FIGS. 11(A), 11(B), 11(C), 11(D), and 11(E) relate, respectively, to the cases of using a notch, a flange, an expanded portion, an expanded portion, and an expanded portion being twisted at a certain angle. When such a stop means as illustrated above is used, it is advantageuos to put a reinforcing core 13 into the jack means 2 so that various works required in providing the stop member 12 are easily carried out without causing unnecessary deformation at a portion of the jack member 2 which is in contact with the plug member 1. FIG. 12 shows a jack member 2 having circulor projections 9*a* and 9*b* provided with a stop means of flange-shape. The above-mentioned stop means are only examples of the embodiment of this invention and other types are also applicable without trouble.

The construction of electrical connectors using such electrical connection elements which have been explained in detail heretofore will be explained, beginning with supporting means of each member.

Figure 13:
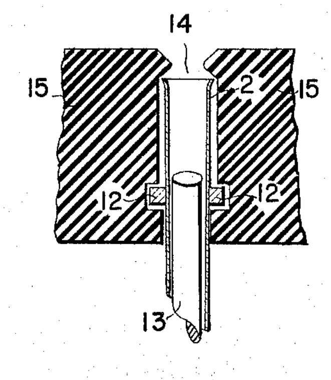
Figure 14:
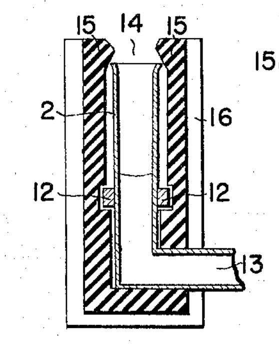

In any case, the jack member 2 is to be supported by an insulating support means or supported 15 which is provided with a hole 14 for holding the jack member, an example of which is shown in section in FIG. 13. The supporter 15 is so designed that the shape thereof is suitable for securely holding the stop means 12. It is necessary that the hole 14 is slightly wider than the cross section of the jack member so as to withstand against the deformation caused by coupling the jack member 2 and the plug member 1. FIG. 14 shows an outside connection terminal which is led out at a certain angle (a right angle in this case shown) to the jack member 2. Said terminal arrangement, of course, is applicable to the case of the plug member. The embodiment of FIG.

Figure 15:
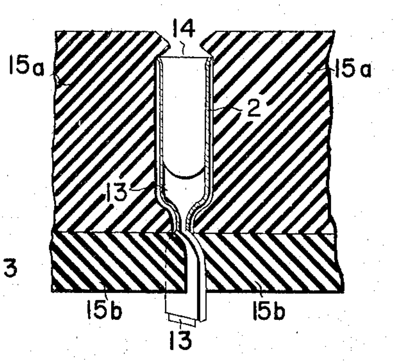
Figure 16:
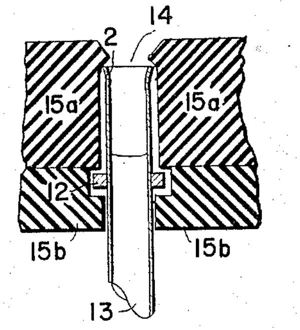
Figure 17A:
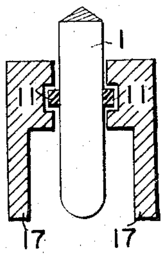
Figure 17B:
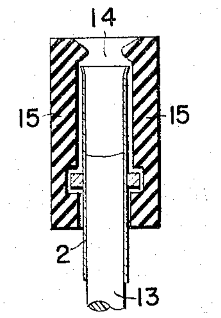

14 is provided with an outside case 16. FIG. 15 relates to the case wherein a stop means being used is of flat shape which is suitable for holding thereof when the insulation supporting means is divided into two members 15a and 15b. FIG. 16 shows an example of general application of such divided insulating supporting member 15a and 15b.

FIG. 17 shows construction of the jack member 2 and plug member 1, in which the plug and jack members are, respectively, supported by supporters 17 and 15. In this illustration, the plug member 1 having a triangular cross section is used together with the jack member 2 having a round cross section, so that the supporter 17 is specifically made to be long enough so that the end portion of the plug member 1 may not be damaged during the handling thereof. When the members 1 and 2 are connected together, the supporter 17 of the plug member 2 will cover the outside of the supporter 15 of the jack member 2.

FIG. 18 shows an example of an electrical connector constructed by utilizing such supporting means as described heretofore, in which FIG. 18(A) shows the jack means 18 having a case 16 wherein the supporter 15 is provided with parallel holes 14. In each of these holes 14, each of the corresponding jack member 2 is inserted. The supporter 15 may be provided either as being divided along the lengthwise direction of the jack member as shown by dotted lines in FIG. 18 or as being divided in the direction orthogonal to lengthwise direction of the jack member 2. In such a construction as shown in FIG. 18(A), the connector can be made easily on mass production basis. FIG. 18(B) shows a plug means 19 in which a plurality of plug members 1 are assembled by a case 16b after the plug members are supported by a supporter 17 as in the case of the plug member 18.

When both means 18 and 19 are coupled, the projection 20a is coupled with the hole 21b and the projection 20b is coupled with the hole 21a, thereby the connection of both means 18 and 19 can be maintained satisfactorily, with each pair of said members forming an insulated independent contact circuit.

FIG. 19 shows an actual embodiment utilizing the plug and jack members as illustrated in FIG. 17.

Since it is obvious that many changes and modification can be made in the above described details without departing from the nature and spirit of the invention, it is understood that the invention is not to be limited to the details described herein except as set forth in the appended claims.

What we claim is:

1. An electrical connection device, comprising a plug member composed of a straight elongated electrical conductor, one end of said conductor decreasing in transverse dimension toward its terminus and the other end of said conductor being adapted to be connected to external connection wires, said conductor having a polygonal cross-section and a twisted configuration with respect to its axis, and a jack member composed of a straight elongated tubular electrical conductor, one end of said tubular conductor being open for accepting therein said plug member led by said one end of said conductor of said plug member and the other end of said tubular conductor being adapted to be connected to external connection wires, the cross-section of said tubular conductor forming essentially a circular closed loop, the inside diameter of the closed loop being slightly smaller than the diameter of a circle circumscribing the cross-section of said conductor of said plug member, said tubular conductor being elastically deformable orthogonally to the length thereof, whereby when said plug member is coupled with said jack member by insertion of said one end of said conductor of said plug member in said open end of said tubular conductor, said tubular conductor is elastically deformed orthogonally of its length and contact between said conductor of said plug member and said tubular conductor is maintained essentially by means of said elastic deformation.

2. An electrical connection device, comprising a plug member composed of a straight elongated electrical conductor, one end of said conductor decreasing in transverse dimension toward its terminus and the other end of said conductor being adapted to be connected to external connection wires, a cross-section of said conductor having petal-shaped projections, and a jack member composed of a straight elongated tubular electrical conductor, one one of said tubular conductor being open for accepting therein said plug member led by said one end of said conductor of said plug member and the other end of said tubular conductor being adapted to be connected to external connection wires, the cross-section of said tubular conductor forming essentially a circular closed loop, the inside diameter of the closed loop being slightly smaller than the diameter of a circle circumscribing the cross-section of said conductor of said plug member, said tubular conductor being elastically deformable orthogonally to the length thereof, whereby when said plug member is coupled with said jack member by insertion of said one end of said conductor of said plug member in said open end of said tubular conductor, said tubular conductor is elastically deformed orthogonally of its length and contact between said conductor of said plug member and said tubular conductor is maintained essentially by means of said elastic deformation.

3. An electrical connection device as defined in claim 2, wherein said conductor of said plug member has a twisted configuration with respect to its axis.

4. An electrical connector comprising, in combination, a plug means and a jack means, said plug means including a plurality of plug members each of which is composed of a straight elongated electrical conductor, one end of each of said conductors decreasing in transverse dimension toward its terminus and the other end of each of said conductors being adapted to be connected to external connection wires, said conductors each having a polygonal cross-section and each having a twisted configuration with respect to its axis, the plug members being arranged in parallel and secured to an insulation material, said jack means including a plurality of jack members each of which is composed of a straight elongated tubular electrical conductor, one end of each of said tubular conductors being open for accepting therein a respective plug member led by said one end of the respective plug member and the other end of said tubular conductor being adapted to be connected to external connection wires, the cross-section of each of the tubular conductors forming essentially a circular closed loop, the inside diameter of said closed loop being slightly smaller than the diameter of a circle circumscribing the cross-section of the conductor of the plug member, each of the tubular conductors being elastically deformable orthogonally to the length thereof, and the jack members being arranged in parallel and secured to an insulation material, each of the plug and jack members being provided with stop means for securing them in their lengthwise direction in said insulation material, whereby when each of said plug members is coupled with a respective one of said jack members by insertion of said one end of said conductor of said jack member in the open end of the tubular conductor of the respective jack member each pair of said plug and jack members forms a separate contact circuit and contact between the respective conductors of each of said pairs is maintained essentially by means of said elastic deformation.

5. An electrical connector comprising, in combination, a plug means and a jack means, said plug means including a plurality of plug members each of which is composed of a straight elongated electrical conductor, one end of each of said conductors decreasing in transverse dimension toward its terminus and the other end of each of said conductors being adapted to be connected to external connection wires, a cross-section of each of the conductors having petal-shaped projections, the plug members being arranged in parallel and secured to an insulation material, said jack means including a plurality of jack members each of which is composed of a straight elongated tubular electrical conductor, one end of each of said tubular conductors being open for accepting therein a respective plug member led by said one end of the respective plug member and the other end of said tubular conductor being adapted to be connected to external connection wires, the cross-section of each of the tubular conductors forming essentially a circular closed loop, the inside diameter of said closed loop being slightly smaller than the diameter of a circle circumscribing the cross-section of the conductor of the plug member, each of the tubular conductors being elastically deformable orthogonally to the length thereof, and the jack members being arranged in parallel and secured to an insulation material, each of the plug and jack members being provided with stop means for securing them in their lengthwise direction in said insulation material, whereby when each of said plug members is coupled with a respective one of said jack members by insertion of said one end of said conductor of said jack member in the open end of the tubular conductor of the respective jack member each pair of said plug and jack members forms a separate contact circuit and contact between the respective conductors of each of said pairs is maintained essentially by means of said elastic deformation.

6. An electrical connector as defined in claim 5, wherein the conductor of each of the plug members is twisted with respect to its axis.

References Cited by the Examiner

UNITED STATES PATENTS

| | | | |
|---|---|---|---|
| 1,259,752 | 3/1918 | Laird | 339—356 |
| 1,686,534 | 10/1928 | Rosenzweig | 339—92 |
| 1,978,510 | 10/1934 | Spence | 339—256 |
| 2,222,527 | 11/1940 | Boughter | 339—256 |
| 2,441,393 | 5/1948 | Buchanan et al. | 339—75 |
| 2,551,423 | 5/1951 | De Vito | 339—252 |
| 2,828,474 | 3/1958 | Fox | 339—278 X |
| 2,883,220 | 4/1959 | Johnson | 339—278 X |
| 2,978,667 | 4/1961 | Watts | 339—95 |
| 3,157,455 | 11/1964 | Takano | 339—256 |
| 3,209,311 | 9/1965 | Kukla | 339—95 X |

FOREIGN PATENTS

| | | |
|---|---|---|
| 137,963 | 4/1930 | Austria. |
| 855,712 | 2/1940 | France. |
| 1,040,322 | 5/1953 | France. |
| 368,101 | 1/1923 | Germany. |
| 564,889 | 11/1932 | Germany. |
| 690,455 | 4/1940 | Germany. |
| 1,018,125 | 10/1957 | Germany. |
| 811,825 | 4/1959 | Great Britain. |

EDWARD C. ALLEN, *Primary Examiner.*

PATRICK A. CLIFFORD, *Examiner.*